United States Patent [19]

Aspen

[11] Patent Number: 4,523,784
[45] Date of Patent: Jun. 18, 1985

[54] LATCH CONSTRUCTION FOR LOCKING A COVER TO A PLATFORM OF A LORRY

[75] Inventor: Kjell Aspen, Halmstad, Sweden

[73] Assignee: AJ-Produkter I Hyltebruk AB, Hyltebruk, Sweden

[21] Appl. No.: 449,854

[22] Filed: Dec. 15, 1982

[30] Foreign Application Priority Data

Dec. 15, 1981 [SE] Sweden ................................ 8107481

[51] Int. Cl.³ .............................................. B60J 7/10
[52] U.S. Cl. ................................. 296/100; 292/256.5; 105/377
[58] Field of Search .................. 296/100, 98; 105/377; 292/256.5, 256.75, 341.15

[56] References Cited

U.S. PATENT DOCUMENTS

| 1,134,175 | 4/1915 | Wheary ................................ 292/35 |
| 1,884,201 | 10/1932 | Phillippe ............................. 292/41 |
| 2,147,903 | 2/1939 | Kaser .................................. 292/41 |
| 2,807,499 | 9/1957 | Duddleston ........................ 296/100 |
| 2,974,999 | 3/1961 | Stuart ............................... 296/100 |
| 2,991,524 | 7/1961 | Dobrikin ............................ 105/377 |
| 3,584,905 | 6/1971 | Emenaker ............................ 292/38 |
| 3,614,154 | 10/1971 | Evans ................................ 296/100 |

FOREIGN PATENT DOCUMENTS 2655988 6/1978 Fed. Rep. of Germany .
2408745 8/1979 France .
1256892 12/1971 United Kingdom .

Primary Examiner—Robert R. Song
Attorney, Agent, or Firm—Jones, Tullar & Cooper

[57] ABSTRACT

A latch construction for locking a cover to the platform of a lorry or the like. The latch construction comprises a profile rail bolted to the side members and back member of the platform; several latch units along the rail including latch elements for releasably receiving the straps depending from the cover; and a wire inside the rail for simultaneously operating all latch elements along the wire from a central latch device including a key-operated lock. In order to connect the wires from rails of adjacent side members, there is adapted interconnection devices. The straps are preferably telescoping straps spring-biased towards the retracted position and are adapted to be releasably retained by a depending shoulder of the rail. The wire is spring-biased against the opened position.

12 Claims, 15 Drawing Figures

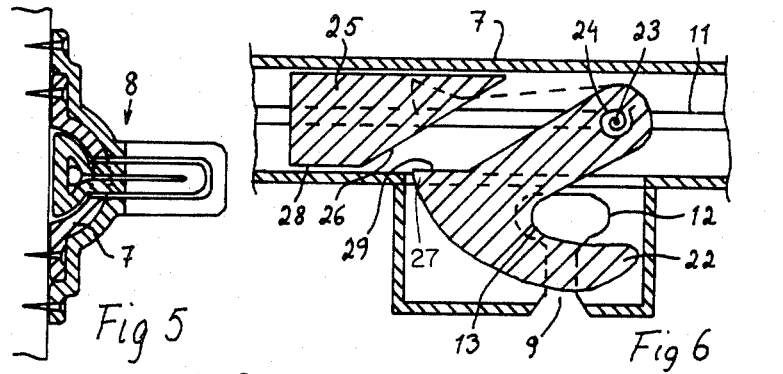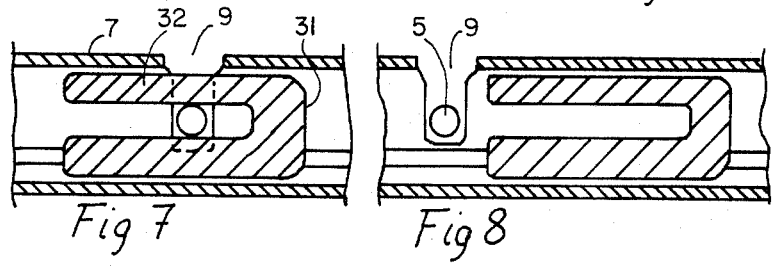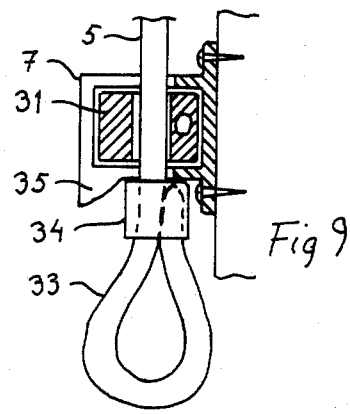

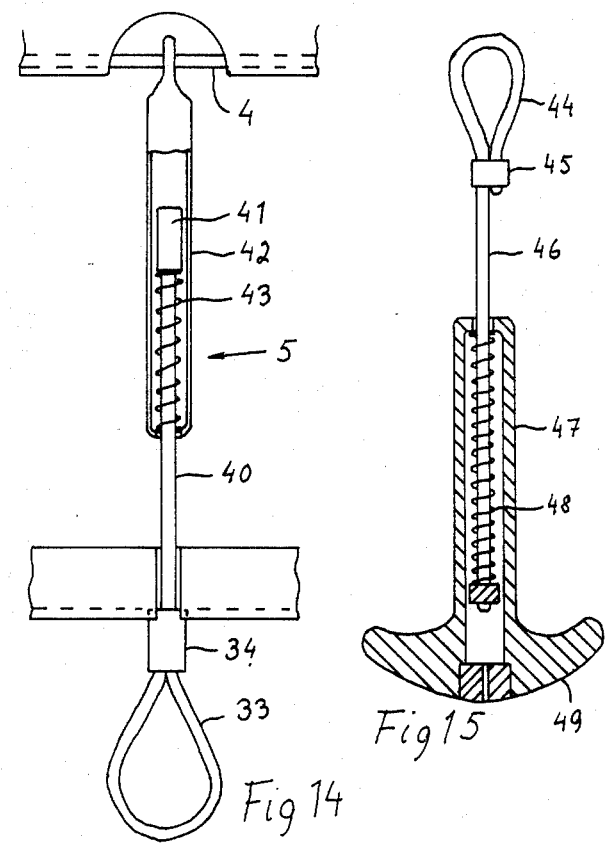

4,523,784

LATCH CONSTRUCTION FOR LOCKING A COVER TO A PLATFORM OF A LORRY

BACKGROUND OF THE INVENTION

The present invention relates to a latch construction for locking a cover to the platform of a lorry or the like.

In the prior art, the cover is usually attached to the platform of a lorry by means of several elastic straps, which are attached to bolts or the like arranged on the sides of the platform. Such a cover is easily opened. Thus, the load on the lorry cannot be left on the platform during the night due to the risk of stealing. There is a need for a latch construction which makes it much more difficult to get access to the covered platform of the lorry in order to prevent stealing or unauthorized access to the platform of the lorry.

SUMMARY OF THE INVENTION

The object of the present invention is to provide such a latch construction for locking the cover to the side members of the platform of a lorry. The latch construction should be easily attached to existing platform side members and should be able to accomodate the presently used straps of the cover. The invention also provides straps suitable for this latch construction.

Thus, according to the invenion, a latch construction is provided comprising several latch units mounted on a profile rail. The profile rail is bolted or otherwise secured to the side members of the platform. The latch units are adapted to receive latch mebers e.g. the straps attached to the border of the cover. Each latch unit comprises a latch element and an operating block. The latch element is adapted to releasably receive one of the latch members, whereupon the latch members can be moved to a locking position by the operating blocks. The operating blocks are fixed to a cable, which is received inside the rail and can be operated from a central position in order to lock each latch unit.

BRIEF DESCRIPTION OF THE DRAWINGS

Further objects and features of the present invention will be evident from the description below of a number of embodiments of the invention by reference to the drawings, wherein:

FIG. 5 is a cross-sectional view similar to FIG. 3 of a second embodiment of the latch unit, FIG. 6 is a cross-sectional view similar to FIG. 4 of a third embodiment of the latch unit, FIG. 7 is a cross-sectional view similar to FIG. 4 of a fourth embodiment of the latch unit, FIG. 8 is a view similar to FIG. 7 but with the latch unit in a second opened position, FIG. 9 is a cross-sectional view similar to FIG. 3 of the third embodiment of FIGS. 7 and 8, FIG. 14 is a side view partially cut away of a strap for use in connection with the latch construction of the invention, FIG. 15 is a cross-sectional side view of a second embodiment of the strap.

DESCRIPTION OF THE PREFERRED EMBODIMENTS

Figure 1:
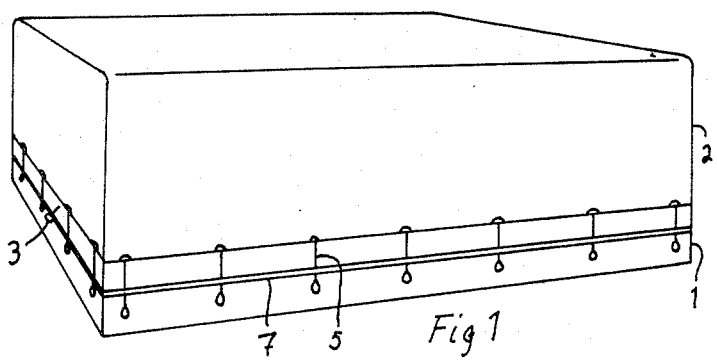
FIG. 1 is a perspective view of a portion of the lorry and the cover provided with the latch construction according to the present invention.
Figures 2, 3:
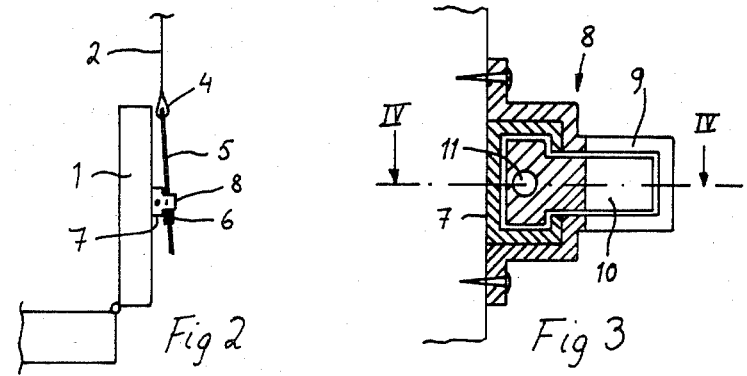
FIG. 2 is an enlarged end view of the latch construction of FIG. 1.
FIG. 3 is an enlarged cross-sectional view of FIG. 2 taken along the line III—III of FIG. 4.

FIGS. 1 and 2 show the platform of a lorry provided with a cover 2, which is connected to the side members 1 of the platform by means of a latch construction according to the invention. The lower border of the cover is reinforced by a steel wire 4 and is provided with a number of straps 5, which end in an enlargement or knot 6.

A profile rail 7 is bolted to the side member 1. The rail is provided with a number of latch units 8, which are shown in greater detail in FIG. 3. Each latch unit 8 is provided with an opening 9 adapted to receive the strap 5 to be introduced into the opening in order to be locked therein. The latch unit comprises a latch element 10 which retains the strap in the latch unit as will be described below.

A steel wire 11 extends inside the rail and is adapted to operate and control the latch element 10. The steel wire extends along the rail 7 between the separate latch units and connects them with a centrally positioned key-operated lock 3 of conventional design.

Figure 4:
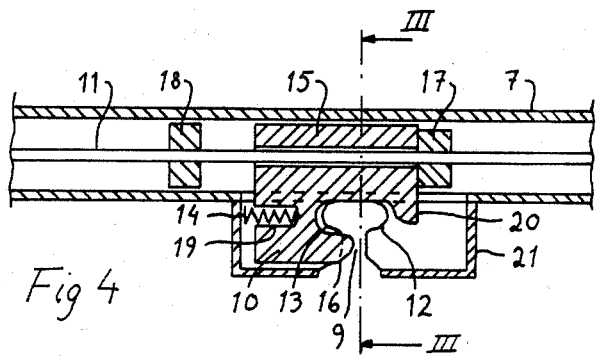
FIG. 4 is a cross-sectional view taken along the line IV—IV of FIG. 3.

Referring to FIGS. 3 and 4 there is shown a latch unit 8 in greater detail. The latch unit comprises an opening 9 having a recess 12 having a semicircular shape. A latch element 10 is adapted inside the latch unit 8 and having a corresponding recess 13. The latch element 10 is movable from the position shown in FIG. 4 and to the left against the action of a spring 14 which is partly enclosed in a hole 19. The latch element 10 has a base portion 15 which is guided inside the rail 7. Moreover, the latch element 10 has an inclined guide surface 16 against which the strap 5 is pressed in order to move the latch element 10 to the left in FIG. 4 against the action of the spring 14 and to introduce the strap 5 in the opening 9 and to the recesses 12 and 13.

The steel wire 11 extending inside the rail 7 is provided with a front and a rear operating block 17 and 18, respectively. The rear operating block 18 is that block which moves the latch element to its locking position and retains it in said position. The front operating block 17 contacts the latch element in the position shown in FIG. 4 in order to provide a clearance between the latch element 10 and its housing such that the strap can be introduced into the opening and also be released from the opening against the action of the spring 14.

The latch unit described above operates as follows. The strap 5 is introduced into the opening 9 and pressed against the inclined surface 16 in order to move the latch element 10 to the left, permitting the introduction of the strap in the recesses 12 and 13. When the central locking device is activated to move the wire 11 to the right in FIG. 4, the latch element is moved to the right by the spring 14, until a shoulder 20 of the latch unit prevents the latch element from moving any further to the right. Further movement of the wire 11 entails that the operating block 18 comes into contact with the back surface of the latch element 10, and the wire 11 is locked in this position by the lock 3, whereby the strap 5 is securely locked in the recesses 12 and 13. The unlocking is done by the opposite operation, as is evident.

Thus, it is possible to lock all latch units by a single lock 3 and prevent unauthorized access to the load on the platform. The steel wire 11 can pass around the corners by means of pulleys or similar means.

Figure 12:
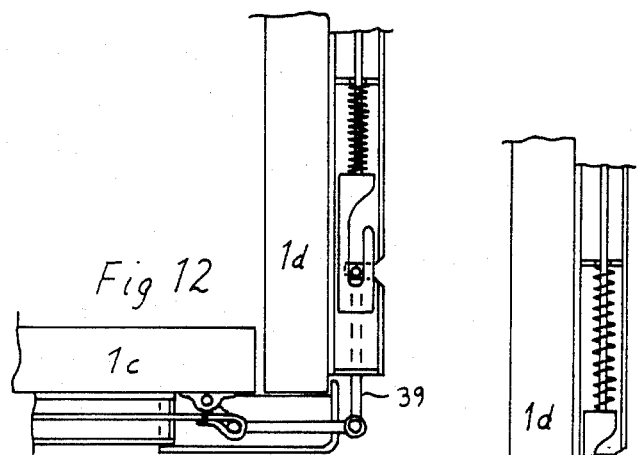
FIG. 12 is a view similar to FIG. 10 but including an angular interconnection member.
Figure 13:
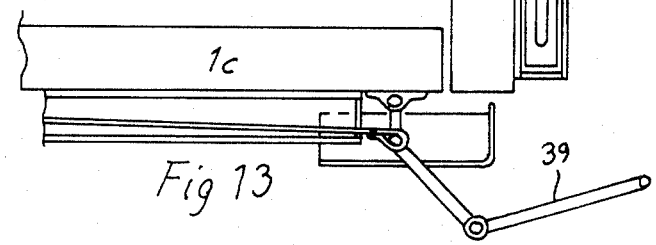
FIG. 13 is a view similar to FIG. 12 but showing the interconnection member in a different position.

If the side members of the platform are divided into portions, the profile rail can also be correspondingly divided and the wire 11 can be provided with suitable connections as shown in FIGS. 12 and 13. The eccentric locking devices for the side members of the platform can also be connected to the locking system of the invention, so that neither side member of the platform can be lowered when the main lock 3 is operated and locked.

In FIG. 5 there is shown a second embodiment of the latch unit according to the invention in cross-sectional view. The profile rail has a semicircular shape and the latch unit has a correspondingly rounded shape.

In FIG. 6 a third embodiment of the latch unit is shown in cross-sectional view. The latch element 22 is pivotable around an axis 23, which is fixedly attached to the rail 7 and is covered by the latch unit 8. The latch element 22 is biased by means of a spring 24 to the position shown in FIG. 6. When a strap is to be introduced into the opening 9 of the latch unit 8, the latch element 22 is moved to the position shown in broken lines, and the opening 9 is opened so that a strap can be introduced into the recesses 12 and 13 as previously described, whereupon the latch element 22 regains the rest position shown in FIG. 6. When the central locking device is activated and moves the steel wire 11 to the right in FIG. 6, an inclined surface 26 of an operating block 25 cooperates with a shoulder 27 of the latch element 22 and presses the latch element to the position shown in FIG. 6 if it is not already in said position, whereupon a straight surface 28 of th operating lock 25 cooperates with a corresponding straight surface 29 of the latch element 22 and locks the element in the position shown in solid lines in FIG. 6.

The steel wire 11 is at one end spring-biased to a retracted position where the latch element 22 is free to move against the action of the spring 24 in order to receive the strap 5. By shaping the operating block 25 with a corresponding long, straight surface 28, which cooperates with a corresponding straight surface 29 of the latch element, it is evident that the locking position of the operating block 25 does not have to be well-defined, but safe locking is achieved as soon as a portion of the surface 28 is placed opposite the surface 29. Thus, a certain clearance of the main locking device is possible.

In FIGS. 7, 8 and 9 there is shown a fourth embodiment of the latch unit, wherein the latch element is incorporated within the profile rail 7. The latch element 31 is U-shaped, one of the legs 32 acting as a latch leg. In the unlocked position shown in FIG. 8, the strap is free to be introduced into the opening 9 and in the locked position shown in FIG. 7 the strap is securely retained in the opening. In FIG. 9 there is shown a strap 5 provided with a bottom loop 33, which is locked by a cable joint 34 of conventional design. The profile rail 7 is provided with a depending shoulder 35, which retains the strap 5 also when the latch element 31 is in the opened position.

Figure 10:
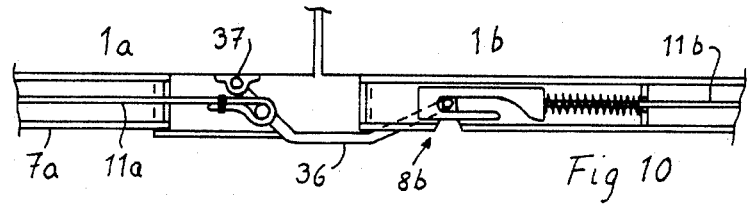
FIG. 10 is a cross-sectional view similar to FIG. 4 showing the interconnection between different rail sections.
Figure 11:
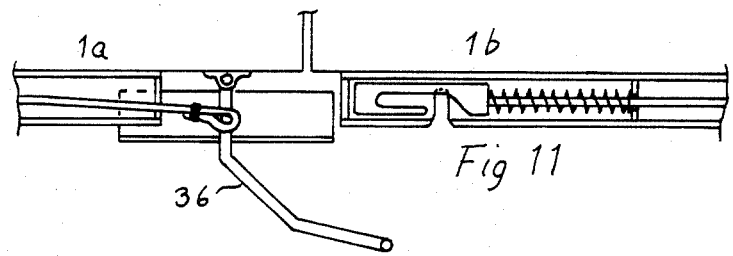
FIG. 11 is a view similar to FIG. 10 but showing the interconnection member in a different position.

In FIGS. 10 and 11 there is shown an interconnection between two side portions 1a and 1b. The steel wire 11a from the left profile rail 7a is connected to a lever 36, which is pivotable around an axis 37. The lever is pivotable into engagement with a latch unit 8b of the same basic construction as the latch unit described above, When the lever 36 is pivoted to the position shown in FIG. 10, the wire 11a is tightened and locks the latch units along the profile rail 7a. When the next corresponding lever at the end of the steel wire 11b is pivoted, the wire 11b locks the lever 36 by means of the latch unit 8b. The steel wire 11a is provided with a strong spring at the second end, not shown, in order to provide for the return movement of the steel wire 11a.

In FIGS. 12 and 13 there is shown an interconnection between two side portions 1c and 1d, which make an angle of 90° relatively to each other. The lever 39 is divided into two portions pivotable connected to each other. In all other respects, the operation is identical to that described above.

By the use of the above-mentioned interconnections, the driver can lock all straps during a single movement around the platform by operating each lever 36 or 39 and all the straps can be finally locked by a single central lock 3.

In FIG. 14 there is shown a strap 5 for use in connection with the latch construction according to the present invention. The strap 5 comprises a loop 33 at the bottom end and a cable joint 34 at the connection between the loop 33 and the wire 40. The upper end of the wire 40 ends in an enlargement 41 positioned inside a tubular housing 42, which is connected at its upper end to the steel wire 4 at the border of the cover. The housing 42 comprises a spring 43, which acts on the enlargement 41 and forces the wire 40 upwards. The operation of the strap is evident from FIG. 14. In FIG. 15 there is shown a second embodiment of the strap 5. The upper end of the strap is connected to the wire 4 of the border of the cover by means of a loop 44 locked by a cable joint 45. The wire 46 of the strap extends inside a handle 47, which encloses a biasing spring 48. The handle 47 is provided at its lower end with a grip 49. The operation of the strap according to FIG. 15 is easily understood.

Several embodiments of the parts of the latch construction according to the invention have been described above in order to explain the invention. However, each element can be modified in many respects within the scope of the invention. The invention is only limited by the appended claims.

The latch construction according to the invention is described in connection with a cover and a platform of a lorry, but it is realized that the latch construction can be used in many different applications, such as covers for ships, railway waggons, tents, tarpaulins, etc.

I claim:

1. A latch construction for locking a cover to a platform comprising:
 a plurality of latch units arranged along the periphery of said platform, each said latch unit including a latch element;
 a plurality of elongated latch members arranged along the periphery of said cover, one end of each latch member being connected to said cover and the other end of each latch member being adapted to engage a corresponding latch unit;
 means for moving each said latch element to an opened position to receive a corresponding latch member and for moving said latch element to a closed position to positively but releasably lock the latch member to said latch unit; and operator means connected to each of said latch elements for simultaneous operation of all said latch elements.

2. The latch construction of claim 1, wherein said operator means is a wire.

3. The latch construction of claim 1, wherein said other end of each latch member has an enlarged portion adapted to engage the coresoponding latch unit.

4. The latch construction of claim 1, further including:
a profile rail extending along and secured to said platform, and wherein each said latch unit is formed as an integral part of said profile rail.

5. The latch construction of claim 4, wherein said profile rail encloses said operator means.

6. The latch construction of claim 5, wherein each latch element is substantially U-shaped and is located within said profile rail.

7. The latch construction of claim 5, wherein each latch unit is mounted on said profile rail, and wherein said latch element for each latch unit is moveable within said profile rail between said opened and said closed positions.

8. The latch construction of claim 1, further including:
central latching means including a key-operated lock, said central latching means being connected to said operator means for simultaneous locking of all said latch units.

9. The latch construction of claim 1, wherein each latch element is substantially U-shaped, the space between the legs thereof receiving a latch member in the closed position.

10. A latch construction for locking a cover to a platform, comprising:
horizontal rail means attached to said platform;
a plurality of latch units positioned at said rail means and integral therewith, each latch unit including an aperture having a vertical axis and opening to an outer side of said rail means;
each said latch unit including a latch element having an opened position and a closed position, each latch element incorporating an opening which registers with said aperture in said latch unit when said latch element is in the opened position;
a plurality of elongated latch members, one end of each of said latch members being connected to a peripheral position of said cover and the other end thereof having an enlarged portion adapted to be releasably received in the opening of a corresponding said latch element when it is in register with the aperture of said latch unit; and
operator means parallel to said rail means and perpendicular to said vertical axis of said aperture for simultaneously moving latch elements between their opened and closed positions to retain said latch members in the openings of corresponding said latch elements when said latch elements are in their closed positions.

11. The latch construction of claim 10, wherein said latch member comprises:
a housing secured at one end to said cover;
a strap having a first end mounted within said housing and a second end extending out of said housing and adapted to engage a latch unit; and
spring means within said housing to bias said strap into said housing and to a contracted position.

12. The latch construction of claim 11, wherein said rail means includes depending shoulder means for retaining the second end of said strap when said strap engages said latch unit.

* * * * *